United States Patent [19]

Houslay

[11] 4,049,897

[45] Sept. 20, 1977

[54] RESIDUAL SOLVENT REMOVAL FROM CHLORINATED POLYMERS

[75] Inventor: Ralph John Gilbert Houslay, Runcorn, England

[73] Assignee: Imperial Chemical Industries Limited, London, England

[21] Appl. No.: 731,936

[22] Filed: Oct. 13, 1976

[30] Foreign Application Priority Data

Nov. 7, 1975 United Kingdom ............... 46207/75

[51] Int. Cl.$^2$ .................. C08C 3/02; C08C 19/12; C08F 6/00
[52] U.S. Cl. ................. 528/483; 260/96 HA; 260/772; 260/816 R; 526/21;22;43
[58] Field of Search .............. 260/772, 816 R, 96 HA; 528/483

[56] References Cited

U.S. PATENT DOCUMENTS

| | | | |
|---|---|---|---|
| 2,581,927 | 1/1952 | Briant | 260/96 |
| 3,677,321 | 7/1972 | Felstead | 159/48 |

Primary Examiner—Stanford M. Levin
Attorney, Agent, or Firm—Cushman, Darby & Cushman

[57] ABSTRACT

A process for at least partly removing residual chlorinated hydrocarbon solvent from a chlorinated polymer obtained by precipitation from the said solvent, which comprises treatment of the chlorinated polymer with the vapor of an aliphatic halo-hydrocarbon having a boiling point below that of the chlorinated hydrocarbon to be removed, at a temperature 10° above the boiling point of the halo-hydrocarbon employed in the treatment.

6 Claims, No Drawings

RESIDUAL SOLVENT REMOVED FROM CHLORINATED POLYMERS

This invention relates to chlorinated polymers.

A process commonly employed for the chlorination of polymers or copolymers (for example natural rubber, polybutadiene, polyisoprene, polyethylene, polypropylene, polyvinyl chloride and ethylene/propylene copolymers) comprises introducing gaseous chlorine into a solution of the polymer or copolymer in a chlorine-resistant organic solvent at an elevated temperature (for example at a temperature in the range of 60° C to 120° C).

The chlorine-resistant solvents commonly employed in this process are chlorinated hydrocarbons, and include not only those solvents which are inert towards chlorine but also others which may react to some dgree with chlorine under the conditions employed but, in so reacting, are converted to chlorinated solvents which are substantially inert towards chlorine. Examples include carbon tetrachloride, chloroform, methylene chloride, trichloroethylene, tetrachloroethane and mixtures thereof.

The chlorinated polymer produced may conveniently be isolated in solid form by treatment of the reaction mixture with steam or hot water, thereby distilling off most of the organic solvent employed degree the chlorination reaction.

The solid chlorinated polymers thus obtained may be dried by conventional means but, even after the drying stage, often retain an appreciable proportion of the organic solvent in the product (for example up to 10 parts by weight of organic solvent per hundred parts by weight of the chlorinated polymer). The residual organic solvent is difficult to remove by further drying or direct distillation, but vapours of the organic solvent retained in the product may in some circumstances be evolved during subsequent use of the chlorinated polymer, for example during the formulation or use of a paint containing the chlorinated polymer. Such evolution of the organic solvent is generally undesirable, for example in view of the toxicity of the solvents commonly employed in the chlorination process.

According to the present invention there is provided a process for at least partly removing residual chlorinated hydrocarbon solvent from a chlorinated polymer obtained by precipitation from the said solvent, which process comprises treatment of the chlorinated polymer with the vapour of an aliphatic halo-hydrocarbon having a boiling point below that of the chlorinated hydrocarbon to be removed, the said treatment being carried out at a temperature of at least 10° C and which is at least 10° C above the boiling-point of the halo-hydrocarbon employed in the treatment.

The lower limit to the boiling-point of the halo-hydrocarbon employed will be determined, in practice, by economic considerations such as the desirability of using a compound which is liquid at ambient temperature and thereby avoiding unnecessary expense of associated refrigeration equipment.

The upper limit to the boiling point of the halo-hydrocarbon employed depends upon the chlorinated hydrocarbon to be removed. The process is preferably carried out with recovery and re-cycling of the halo-hydrocarbon employed and it is therefore desirable that the halogeno-hydrocarbon employed should be readily separable from the chlorinated hydrocarbon to be removed from the polymer. Thus it is preferred that the boiling point of the halo-hydrocarbon employed is at least 5° C lower (for example at least 10° C lower) than the boiling point of the chlorinated hydrocarbon to be removed.

The temperature at which the treatment is carried out may be, for example, in the range from 10° C to 50° C above the boiling-point of the halo-hydrocarbon employed in the treatment.

The upper limit of the treatment temperature will be set, in practice, by the need to avoid degradation of the chlorinated polymer being treated. In general it is preferred that the treatment temperature should not exceed 130° C but the practical upper limit may readily be determined for a particular chlorinated polymer.

Suitable halo-hydrocarbons for use in the treatment include chloro-, chlorofluoro- and chlorofluoro-bromo-hydrocarbons. The preferred halo-hydrocarbons are halo-methanes, for example:

methylene chloride (boiling point 40° C)
chloroform (boiling point 61° C)
fluorotrichloromethane (boiling point 24° C)
difluorodichloromethane (boiling point −30° C)
difluorodichloromethane (boiling point −4° C)

The process of the present invention is especially applicable in the removal of carbon tetrachloride (boiling point 77° C) from chlorinated polymers and the preferred halo-hydrocarbons for use in the treatment for this purpose are methylene chloride and chloroform.

When methylene chloride is employed in the removal of carbon tetrachloride the treatment is preferably carried out at a temperature in the range from 50° C to 80° C (for example at about 65° C). When chloroform is employed in the removal of carbon tetrachloride the treatment temperature is preferably in the range from 75° C to 100° C (for example at about 85° C).

The treatment may be carried out using a variety of techniques conventionally employed in the art of contacting a solid with a gas or vapour. Thus the chlorinated polymer may be disposed, for example, in a static bed (which may be stirred or otherwise agitated) or in a fluidised bed. Alternatively, the chlorinated polymer may be allowed to fall through a zone in which the vapour of the halo-hydrocarbon is encountered.

The treatment is conveniently carried out at substantially atmospheric pressure but higher or lower pressures may be used if desired.

The use of reduced pressure may be advantageous, for example, when it is desired to carry out the treatment at a relatively low temperature and thereby minimise degradation of the chlorinated polymer.

The vapour of the halo-hydrocarbon may, if desired, be diluted with a diluent (for example nitrogen) which is inert towards both the chlorinated polymer to be treated and towards the halo-hydrocarbon employed in the treatment. The proportion of any diluent is, however, preferably not more than 10 parts by volume of diluent per 100 parts by volume of the halo-hydrocarbon employed.

The term 'chlorinated polymer' as used herein includes chlorinated co-polymers and mixtures of two or more chlorinated polymers and/or copolymers.

The chlorinated polymers which may be treated include those mentioned hereinbefore in relation to the known chlorination process, for example natural rubber, polybutadiene, polyisoprene, polyethylene, polypropylene, polyvinyl chloride and ethylene/propylene copolymers, and mixtures thereof.

The term 'boiling-point' as used herein denotes the boiling-point at atmospheric pressure.

The invention is illustrated by the following Examples, in which parts and percentages are by weight unless otherwise stated.

EXAMPLE 1

The chlorinated polymer used as starting material had been prepared by chlorination of degraded cis 1,4-polyisoprene in carbon tetrachloride solution at 68° C using gaseous chlorine, until the chlorine content of the polymer was 66% by weight. THe chlorinated polyisoprene was then precipitated by injection of the solution into hot water (93° C) and the precipitated polymer was dried in a stream of hot air. The carbon tetrachloride content of the dried chlorinated polyisoprene was 6.7% by weight.

A sample of the material was treated with methylene chloride vapour as follows. Methylene chloride was continuously vaporised and the vapour was passed at a constant rate upwardly through a bed of 10 grams of the chlorinated polyisoprene maintained at a temperature of 65° C. A total of 21 grams of methylene chloride vapour was passed through the bed over a period of 1 hour, after which any residual methylene chloride was removed by purging with a stream of nitrogen. The carbon tetrachloride content of the treated chlorinated polyisoprene was 0.1% by weight

EXAMPLE 2

The chlorinated polymer used as starting material was the same chlorinated polyisoprene as in Example 1 (containing 6.7% by weight of carbon tetrachloride).

A sample of this material was treated with chloroform vapour as follows. Chloroform was continuously vaporised and the vapour was passed upwardly through a bed of 10 grams of the chlorinated polyisoprene maintained at a temperature of 88° C. A total of 1.2 liters of chloroform was passed through the bed over a period of 1 hour, after which any residual chloroform was removed by purging with a stream of nitrogen.

The carbon tetrachloride content of the treated chlorinated polyisoprene was 0.2% by weight.

EXAMPLE 3

The chlorinated polymer used as starting material had been prepared by chlorination of polypropylene in carbon tetrachloride solution at 68° C until the chlorine content of the polymer was 66% by weight. After precipitation by hot water and drying in a stream of hot air the carbon tetrachloride content of the dried chlorinated polypropylene was 10.6% by weight.

A sample of this material was treated with methylene chloride vapour at 65° C by the method described in Example 1. The carbon tetrachloride content of the treated chlorinated polypropylene was 0.1% by weight.

What is claimed is:

1. A process for at least partly removing residual chlorinated hydrocarbon solvent from a chlorinated polymer obtained by precipitation from the said solvent, which process comprises treatment of the chlorinated polymer with the vapour of an aliphatic halo-hydrocarbon having a boiling point below that of the chlorinated hydrocarbon to be removed, the said treatment being carried out at a temperature of at least 10° C and which is at least 10° C above the boiling point of the halo-hydrocarbon employed in the treatment.

2. A process according to claim 1 wherein the boiling point of the halo-hydrocarbon employed in the treatment is at least 5° C lower than the boiling point of the chlorinated hydrocarbon to be removed.

3. A process according to claim 1 wherein the treatment is carried out at a temperature in the range from 10° C to 50° C above the boiling point of the halo-hydrocarbon employed in the treatment.

4. A process according to claim 1 wherein the chlorinated hydrocarbon to be removed is carbon tetrachloride, the halo-hydrocarbon employed in the treatment is methylene chloride and the treatment is carried out at a temperature in the range from 50° C to 80° C.

5. A process according to claim 1 wherein the chlorinated hydrocarbon to be removed is carbon tetrachloride, the halo-hydrocarbon employed in the treatment is chloroform and the treatment is carried out at a temperature in the range from 75° C to 100° C.

6. A process according to claim 1 wherein the chlorinated polymer treated is chlorinated polyisoprene.

* * * * *